United States Patent
Wang et al.

(10) Patent No.: US 12,407,708 B2
(45) Date of Patent: Sep. 2, 2025

(54) SYSTEM AND METHOD FOR DETECTING VULNERABILITY OF INTERNET OF THINGS IN POWER SYSTEMS (IOTIPS) PROTOCOL BASED ON FUZZ TESTING

(71) Applicant: State Grid Hubei Electric Power Research Institute, Hubei (CN)

(72) Inventors: Jin Wang, Hubei (CN); Yu Shen, Hubei (CN); Chang Liu, Hubei (CN); Jiangpei Xu, Hubei (CN); Chang Liu, Hubei (CN); Xiao Yu, Hubei (CN); Li Tian, Hubei (CN); Jie Wang, Hubei (CN); Liang Zhou, Hubei (CN); Feng Long, Hubei (CN)

(73) Assignee: State Grid Hubei Electric Power Research Institute, Wuhan (CN)

( * ) Notice: Subject to any disclaimer, the term of this patent is extended or adjusted under 35 U.S.C. 154(b) by 330 days.

(21) Appl. No.: 18/016,877

(22) PCT Filed: May 20, 2022

(86) PCT No.: PCT/CN2022/094037
§ 371 (c)(1),
(2) Date: Jan. 19, 2023

(87) PCT Pub. No.: WO2022/247738
PCT Pub. Date: Dec. 1, 2022

(65) Prior Publication Data
US 2023/0188556 A1    Jun. 15, 2023

(30) Foreign Application Priority Data
May 24, 2021    (CN) .......................... 202110567713

(51) Int. Cl.
*H04L 9/40*    (2022.01)
(52) U.S. Cl.
CPC .............................. *H04L 63/1433* (2013.01)
(58) Field of Classification Search
CPC ............... H04L 45/586; H04L 61/4552; H04L 12/4641; H04L 45/02; H04L 45/66;
(Continued)

(56) References Cited

U.S. PATENT DOCUMENTS 10,452,526 B2 * 10/2019 Rajpal .................. G06F 21/577
10,764,319 B2 *  9/2020 Dhakshinamoorthy .....................
                                                    H04L 63/1466
(Continued)

FOREIGN PATENT DOCUMENTS

| CN | 108449234 A | * | 8/2018 | ......... H04L 63/1458 |
| CN | 110597734 A | * | 12/2019 | .......... G06F 11/3684 |
| CN | 111897733 B | * | 4/2023 | ............. G06N 3/006 |

*Primary Examiner* — Yonas A Bayou

(57) ABSTRACT

Disclosed are a system and method for detecting a vulnerability of an Internet of Things in Power Systems (IOTIPS) protocol based on fuzz testing. The system includes: a protocol configuration module configured to configure a protocol to be detected and a data frame of the protocol to be detected; a sample generation module configured to: after loading the protocol and the data frame configured by the protocol configuration module, configure a mutation strategy based on the loaded protocol, and generate a test sample based on the configured mutation strategy; and an execution monitoring module configured to transfer the test sample generated by the sample generation module to a device to be detected for testing, perform link management and test execution, store a test result, and generate a detection report.

7 Claims, 11 Drawing Sheets

(58) Field of Classification Search
CPC ..... H04L 45/745; H04L 49/70; H04L 61/103; H04L 63/101; H04L 63/166
See application file for complete search history.

(56) References Cited

U.S. PATENT DOCUMENTS

| | | | | |
|---|---|---|---|---|
| 2008/0301813 | A1* | 12/2008 | Neystadt | G06F 11/3672 726/25 |
| 2015/0309914 | A1* | 10/2015 | Eddington | G06F 11/3452 717/124 |
| 2016/0150057 | A1* | 5/2016 | Men | H04L 69/08 709/230 |
| 2016/0350211 | A1* | 12/2016 | Cecchetti | G06F 11/3696 |
| 2018/0365129 | A1* | 12/2018 | Bates | G06F 11/079 |
| 2019/0109872 | A1* | 4/2019 | Dhakshinamoorthy | G06F 21/577 |
| 2020/0153651 | A1* | 5/2020 | Wang | H04W 76/11 |
| 2022/0035927 | A1* | 2/2022 | Lysecky | G06F 21/566 |

* cited by examiner

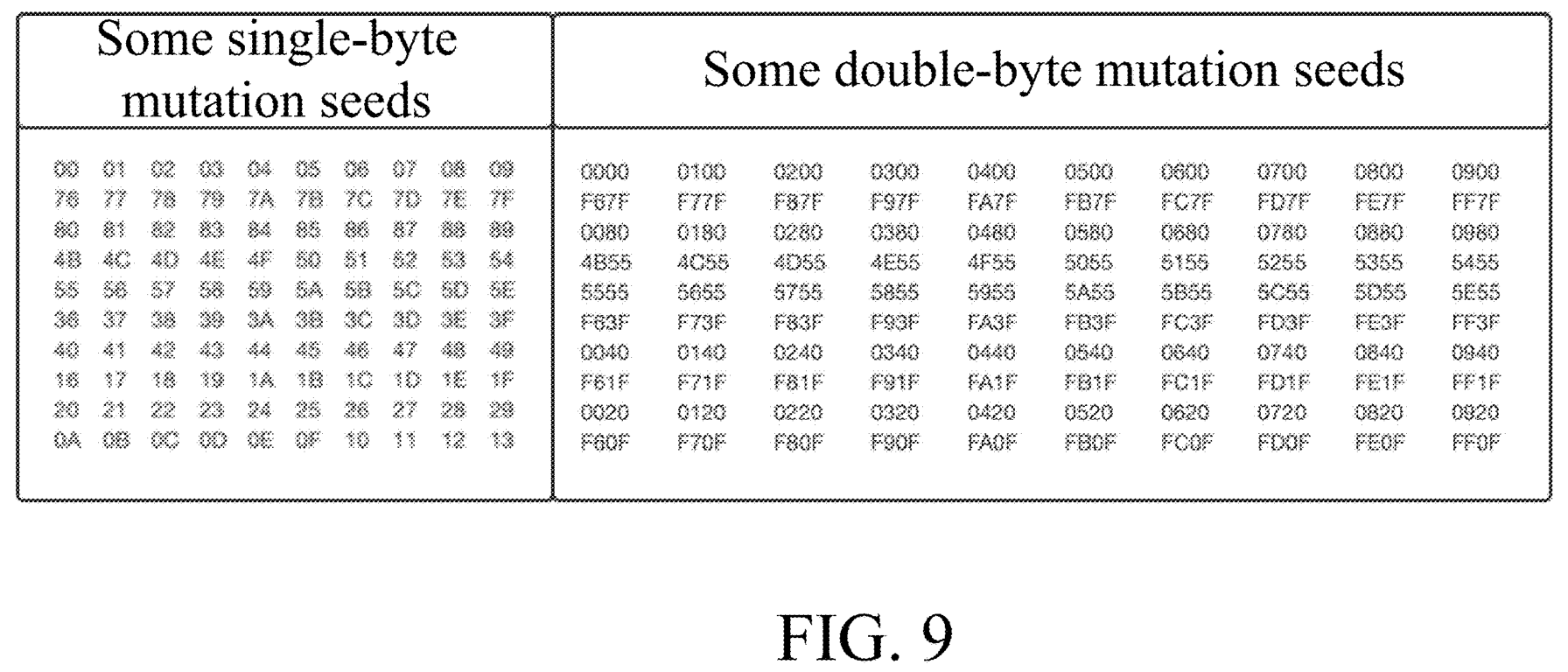

| Some single-byte mutation seeds | | | | | | | | | | | | |
|---|---|---|---|---|---|---|---|---|---|---|---|---|
| 00 | 01 | 02 | 03 | 04 | 05 | 06 | 07 | 08 | 09 | | | |
| 7F | 77 | 7E | 7D | 7C | 7B | 7A | 7D | 7E | FF | | | |
| 80 | 80 | 7E | 83 | 82 | 81 | 80 | 87 | 86 | 85 | | | |
| 4B | 4C | 4D | 4E | 4F | 50 | 51 | 52 | 53 | 54 | | | |
| 55 | 56 | 57 | 58 | 59 | 5A | 5B | 5C | 5D | 5E | | | |
| 3E | 3F | 40 | 41 | 42 | 43 | 44 | 45 | 46 | 47 | | | |
| 48 | 49 | 4A | 1A | 1B | 1C | 1D | 1E | 4F | | | | |
| 1F | 1F | 1E | 1D | 1C | 1B | 1A | 19 | 18 | 17 | | | |
| 20 | 21 | 22 | 23 | 24 | 25 | 26 | 27 | 28 | 29 | | | |
| 0B | 0C | 0D | 0E | 0F | 10 | 11 | 12 | 13 | | | | |
| 0A | | | | | | | | | | | | |

| Some double-byte mutation seeds | | | | | | | | | |
|---|---|---|---|---|---|---|---|---|---|
| 0000 | 0100 | 0200 | 0300 | 0400 | 0500 | 0600 | 0700 | 0800 | 0900 |
| F07F | F77F | F87F | F97F | FA7F | FB7F | FC7F | FD7F | FE7F | FF7F |
| 0080 | 0180 | 0280 | 0380 | 0480 | 0580 | 0680 | 0780 | 0880 | 0980 |
| 4B55 | 4C55 | 4D55 | 4E55 | 4F55 | 5055 | 5155 | 5255 | 5355 | 5455 |
| 5555 | 5655 | 5755 | 5855 | 5955 | 5A55 | 5B55 | 5C55 | 5D55 | 5E55 |
| F03F | F73F | F83F | F93F | FA3F | FB3F | FC3F | FD3F | FE3F | FF3F |
| 0040 | 0140 | 0240 | 0340 | 0440 | 0540 | 0640 | 0740 | 0840 | 0940 |
| F01F | F71F | F81F | F91F | FA1F | FB1F | FC1F | FD1F | FE1F | FF1F |
| 0020 | 0120 | 0220 | 0320 | 0420 | 0520 | 0620 | 0720 | 0820 | 0920 |
| F00F | F70F | F80F | F90F | FA0F | FB0F | FC0F | FD0F | FE0F | FF0F |

FIG. 9

| Protocol name | Type | Description |
|---|---|---|
| 104 protocol | | Grid protocol DL/T634.5104-2009 |

| SN | Function | Type | Frame format |
|---|---|---|---|
| 1 | General call | | 68 0E 27 00 0A 00 64 01 06 00 03 00 00 00 00 14 |
| 2 | Clock synchronization | | 68 14 2A 00 0B 00 67 03 06 00 03 00 79 C3 0F 00 0C 14 |
| 3 | General watt-hour call | | 68 0E 2C 00 EA 01 65 01 06 00 05 00 00 00 00 45 |
| 4 | U_START | | 68 04 07 00 00 00 |
| 5 | U_STOP | | 68 04 13 00 00 00 |
| 6 | U_TEST | | 68 04 43 00 00 00 |

FIG. 11

Edit a strategy

| | |
|---|---|
| Strategy name: | test |
| Protocol name: | 104 protocol ⌄ |
| Function name: | General call ⌄ |
| Frame format preview: | 68 0E 28 00 3A 01 64 01 06 00 01 00 00 00 00 1 |
| Mutation mode: | ○ Single-byte mutation   ● Double-byte mutation |
| Start position: | Character 3   3 ⌄ |
| Mutation sample: | ○ System sample   ○ Custom fixed value   ● Custom range |
| Sample value: | 1A1B,1A2E   Hexadecimal number in a format of: |
| Description: | |

Close   Save

FIG. 12

SYSTEM AND METHOD FOR DETECTING VULNERABILITY OF INTERNET OF THINGS IN POWER SYSTEMS (IOTIPS) PROTOCOL BASED ON FUZZ TESTING

TECHNICAL FIELD

The present disclosure relates to a technical field of an Internet of Things (IoT), and specifically, to a system and method for detecting a vulnerability of an Internet of Things in Power Systems (IOTIPS) protocol based on fuzz testing.

BACKGROUND

With the continuous development of IoT technologies and communication capabilities, an IOTIPS based on an industrial control system is also constantly improving and gradually developing. With the development of the IOTIPS, security issues of network communication related to the IOTIPS are gradually exposed. Different from a traditional network communication protocol, an industrial control communication protocol of the IOTIPS is based on the industrial control system and is mainly configured to complete mutual communication between industrial control systems. An architecture of the IOTIPS is shown in Prior Art FIG. 1. In order to ensure secure and stable communication of the industrial control system, a sufficiently robust and secure industrial control communication protocol needs to be used.

A vulnerability of protocol communication can be exploited by an intruder to control the entire industrial control system, which poses a great threat. Therefore, it is very necessary to have a security detection of the protocol to ensure that the protocol is secure and robust. Vulnerability detection of the protocol is capable of reasonably analyzing the security of the protocol, detecting potential security issues during design and use of the protocol, and resolving the potential security issues to ensure the security of the protocol and communication security. However, existing traditional testing methods are not capable of effectively detecting vulnerabilities of the protocol in the industrial control system of the IOTIPS.

SUMMARY

To resolve the above problem in the prior art, the present disclosure provides a system and method for detecting a vulnerability of an Internet of Things in Power Systems (IOTIPS) protocol based on fuzz testing, to construct a detection process of the fuzz testing mainly by managing a protocol to be detected, configuring a mutation strategy, and querying detection details, and form a vulnerability detection prototype system of an industrial control communication protocol of the IOTIPS, so as to perform protocol configuration and testing conveniently, quickly, and efficiently.

To achieve the above objective, the present disclosure provides following technical solutions:

A system for detecting a vulnerability of an IOTIPS protocol based on fuzz testing includes:
  a protocol configuration module configured to configure a protocol to be detected and a data frame of the protocol to be detected;
  a sample generation module configured to: after loading the protocol and the data frame configured by the protocol configuration module, configure a mutation strategy based on the loaded protocol, and generate a test sample based on the configured mutation strategy; and
  an execution monitoring module configured to transfer the test sample generated by the sample generation module to a device to be detected for testing, perform link management and test execution, store a test result, and generate a detection report.

Further, the protocol configuration module configuring the protocol to be detected and the data frame of the protocol to be detected specifically includes: determining a protocol name, add a protocol description while creating the protocol name, adding, based on a test need after determining the protocol, a data frame that needs to be tested, and determining a function name and a frame format of the configured data frame.

Further, the configuring a mutation strategy includes configuring a strategy name, a protocol name, a function name, a frame preview, a mutation mode, a start position, and a mutation sample, where the strategy name, the protocol name, the function name, and the frame preview belong to description fields.

Further, the mutation mode includes a single-byte mode and a double-byte mode, and whether to use the single-byte mode or the double-byte mode can be customized based on a semantic need of a field.

Further, the start position is configured to accurately describe a position where mutation needs to be performed, so as to avoid meaningless redundancy caused by performing mutation on all positions.

Further, the mutation sample may be set to a system sample, a custom fixed value, or a custom range, the system sample has built-in typical mutation values corresponding to the single-byte mode and the double-byte mode respectively, the custom fixed value and the custom range are configured to generate targeted test-specific mutation sample content for semantically-free industrial control communication protocols of various private IOTIPSs after semantic analysis.

Further, a method of triggering the sample generation module includes generating a test task or transferring in an abnormal sample after a round of testing, which is specifically as follows: when executing the test task, determining and configuring protocol information by means of the sample generation module, determining whether to use a single-byte mode or a double-byte mode, determining a start position of the data frame where mutation needs to be started, selecting a predefined or custom sample, and then generating, based on the configured mutation strategy, the test sample to be delivered to an execution monitoring system for a first round of testing by means of the sample generation module; and after the first round of testing, a second method of triggering the sample generation module includes transferring the test sample generated in the first round of testing to a secondary learning model of the sample generation module, and generating a test sample to be delivered to the execution monitoring system for a second round of testing.

Further, a Seq2Seq model of an Attention mechanism introduced is used in secondary learning, where the Seq2Seq model mainly includes an Encoder and a Decoder; after primary detection is completed for the generated sample, secondary learning is performed on a marked abnormal sample by using the Seq2Seq model and then secondary detection is conducted to obtain more abnormal data frames with a higher hit ratio; and in a model training process, a mean absolute error (MAE) is configured to express a difference between a predicted data frame and an actual data frame, where assuming that $x_1, x_2, \ldots, x_i$ is configured to represent a predicted data sequence, and $y_1, y_2, \ldots, y_i$ is configured to represent an actual data sequence, the MAE is expressed as follows:

$$MAE = \frac{\sum_{i=1}^{n} |y_i - x_i|}{n}$$

where the MAE is more directly expressed as follows:

$$MAE = \frac{1}{n} \sum_{i=1}^{n} |(y_1 - x_1)| + \ldots + |(y_i - x_i)|;$$

in the model training process, a loss function is optimized by using a stochastic gradient descent method, where X represents the predicted data sequence $x_1, x_2, \ldots, x_i$ assumed above, and Y represents the actual data sequence $y_1, y_2, \ldots, y_i$, which are represented as logMAE(X, Y); and when logMAE(X, Y) reaches a minimum value, values of the variables X, Y are expressed as follows as a whole:

argmin logMAE(X,Y)

Further, the link management performed by the execution monitoring module is to manage a connection between a test system and the device to be detected, including a link name, a link type, and specific content; the test execution is responsible for selecting a test item to start a test task, including setting a task name, selecting a link, and selecting the mutation strategy; and during the test execution, currently completed test content is viewed at any time through status monitoring, including a selected protocol name, a function name, packet sending and receiving time, an original data frame, a mutated data frame, and a response result, and the system stores the test result, and marks a data frame with an abnormal response result in the exported report as a main basis for vulnerability analysis.

A method for detecting a vulnerability of an IOTIPS protocol based on fuzz testing includes steps of:

protocol configuration: configuring a protocol to be detected and a data frame of the protocol to be detected, specifically including: determining a protocol name, adding a protocol description while creating the protocol name, adding, based on a test need after determining a protocol, a data frame that needs to be tested, and determining a function name and a frame format of the configured data frame, to load the configured protocol and the configured data frame to a sample generation module;

sample generation: after loading the configured protocol and the configured data frame, configuring a mutation strategy based on the loaded protocol, and generating a test sample based on the configured mutation strategy; and execution monitoring: transferring the test sample generated by the sample generation module to a device to be detected for testing, performing link management and test execution, storing a test result, and generating a detection report.

To avoid defects of a fuzz testing method of a traditional network protocol and limitations of vulnerability detection of an industrial control communication protocol of the IOTIPS, the present disclosure develops, based on a traditional vulnerability detection method based on fuzz testing, a system for detecting a vulnerability of the industrial control communication protocol of the IOTIPS based on fuzz testing. The present disclosure has three new features: the protocol to be detected can be managed, the mutation strategy can be configured, and detection details can be queried, so as to realize free protocol management, flexible sample generation, and convenient content query. In addition, after a conventional vulnerability detection process, the present disclosure performs secondary learning on the detection result based on the Seq2Seq with the Attention mechanism, so as to generate a data packet with a more obvious vulnerability characteristic, transfers the data packet to the execution monitoring module again for secondary vulnerability detection, and obtains, through verification, a test sample causing an abnormality. This method can significantly improve a capability of collecting an abnormal packet, thereby improving efficiency of vulnerability detection.

BRIEF DESCRIPTION OF THE DRAWINGS

Prior Art

FIG. 9 shows some built-in mutation samples of a system;

FIG. 11 shows a protocol and data frame configuration model;

FIG. 12 shows a test sample customization model; and

DETAILED DESCRIPTION

In order to make the objectives, technical solutions, and advantages of the embodiments of the present disclosure clearer, the following clearly and completely describes the technical solutions in the embodiments of the present disclosure with reference to accompanying drawings in the embodiments of the present disclosure. Apparently, the described embodiments are some rather than all of the embodiments of the present disclosure. All other embodiments obtained by those of ordinary skill in the art based on the embodiments of the present disclosure without making inventive efforts shall fall within the scope of protection of the present disclosure.

As a vulnerability mining method, fuzz testing is widely used in software testing. The present disclosure detects protocol security through fuzz testing. fuzz testing is mainly to generate a required test sample according to a certain rule, and automatically send the test sample to a test target to cause an abnormality to the target, so as to determine a possible threat.

Figure 1:
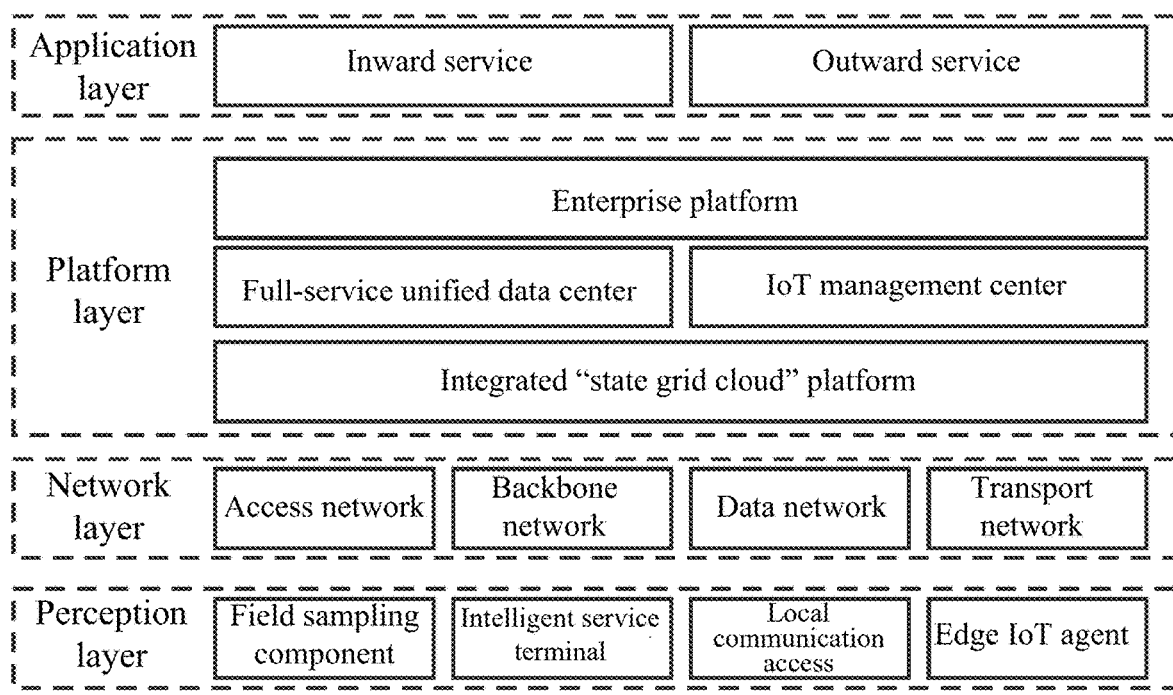
FIG. 1 shows an architecture of an IOTIPS.
Figure 2:
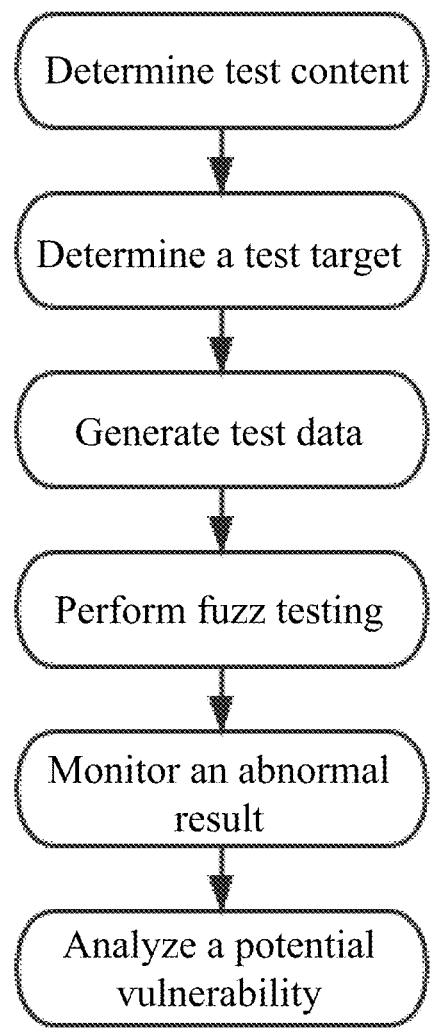
FIG. 2 shows basic stages of fuzz testing according to the present disclosure.

In order to make fuzz testing have characteristics that a protocol to be detected can be managed, a mutation strategy can be configured, and detection details can be queried, the present disclosure develops a system for detecting a vulnerability of an industrial control communication protocol of an IOTIPS based on fuzz testing. A main framework of the system is built based on a traditional fuzz testing process, which can significantly improve a test capability and test effect for the industrial control communication protocol of the IOTIPS. FIG. 2 shows basic stages of fuzz testing.

Figure 3:
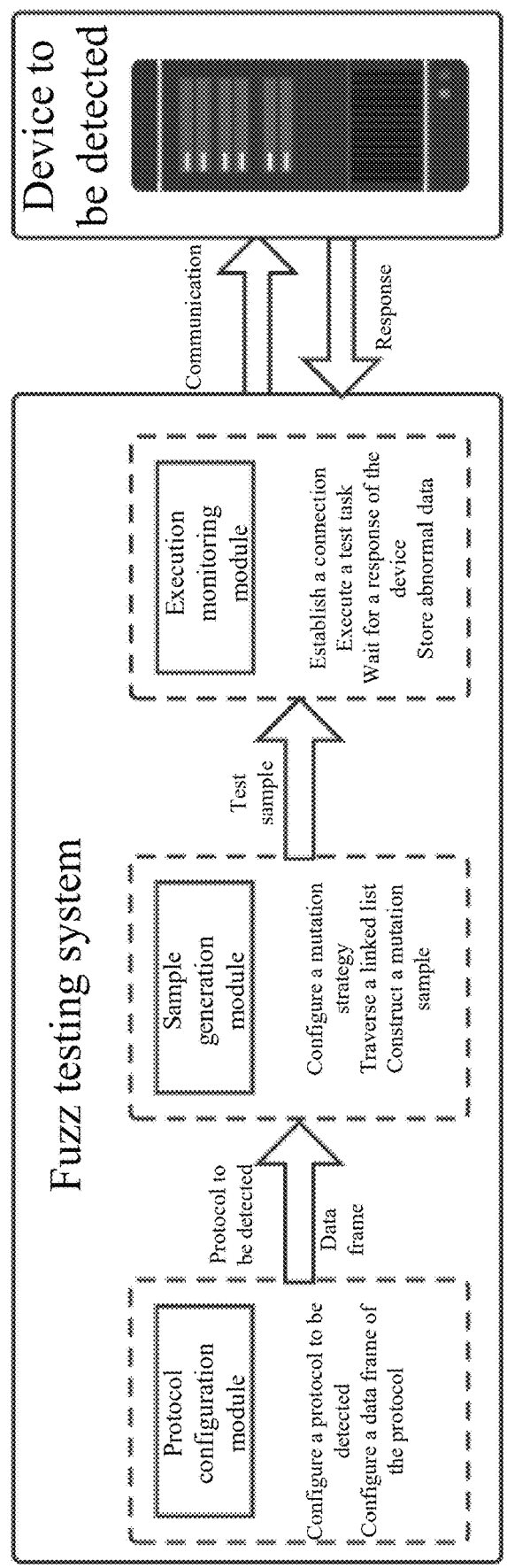
FIG. 3 is a schematic structural diagram of a system for detecting a vulnerability of an IOTIPS protocol based on fuzz testing according to an embodiment of the present disclosure.

Referring to FIG. 3, an embodiment of the system for detecting a vulnerability of an industrial control communication protocol of an IOTIPS based on fuzz testing according to the present disclosure includes: a protocol configuration module for protocol management, a sample generation module for test sample generation, and an execution monitoring module for text execution and result query. The sample generation module defines a sample mutation strategy for a data frame of a protocol configured by the protocol configuration module, and generates a required test sample based on the mutation strategy. The execution monitoring module sends the generated sample to a device to be detected, monitors a response status, stores a result after batch processing, and outputs the result as a detection report.

The protocol configuration module is configured to configure the protocol to be detected and the data frame of the protocol to be detected. Specifically, the protocol configuration module is configured to configure the protocol, mainly including a protocol name and a protocol description. After the protocol to be detected is added, the data frame can be added to the relevant protocol, and then the protocol and the data frame can be modified, added or deleted in the protocol configuration module. The protocol configured by the protocol configuration module can be selected by the sample generation module, and the configured protocol and data frame are loaded to the sample generation module to analyze and set a start address where mutation needs to be performed, a mutation mode, mutation content, and the like. A protocol and data frame configuration model is shown in FIG. 11. Different from traditional fuzz testing provided with a built-in inherent protocol that cannot be modified, the protocol configuration module in the present disclosure allows a user to customize protocol content freely.

Figure 4:
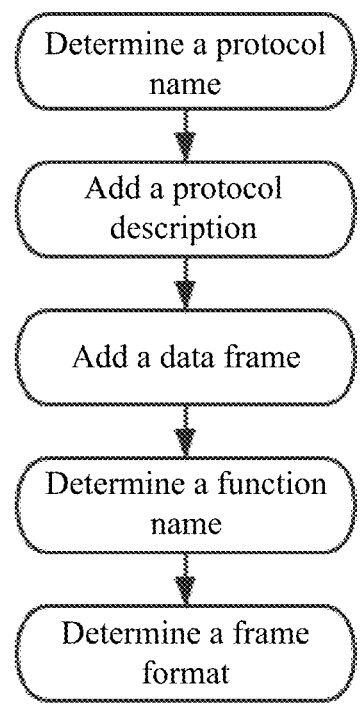
FIG. 4 is a flowchart of protocol configuration.

A protocol configuration process is shown in FIG. 4. In protocol configuration, the protocol name needs to be determined first. The protocol description needs to be added while the protocol name is created, to facilitate later use and maintenance. After the protocol is determined, a data frame that needs to be tested needs to be added based on a test need. For the configured data frame, a function name and a frame format need to be determined and are loaded to the sample generation module.

The protocol configuration module mainly realizes manageability of the protocol to be detected. For a current situation that most industrial control networks use dedicated protocols, the protocol configuration module analyzes and is internally provided with specifications IEC 60870-5-101 and IEC 60870-5-104 used in an IOTIPS, and provides custom protocol types and protocol data frame management.

The sample generation module is configured to: after loading the protocol and the data frame configured by the protocol configuration module, configure the mutation strategy based on the loaded protocol, and generate the test sample based on the configured mutation strategy. The test sample is transferred to the execution monitoring module, and the execution monitoring module sends the test sample to a test target for testing. The configuring the mutation strategy includes configuring a strategy name, a protocol name, a function name, a frame preview, a mutation mode, a start position, and a mutation sample, where the strategy name, the protocol name, the function name, and the frame preview belong to description fields. The description fields are fields that only describe information associated with the configuration, and do not actually affect a mutation process. The mutation mode includes a single-byte mode and a double-byte mode, and whether to use the single-byte mode or the double-byte mode may be customized based on a semantic need of a field. The start position is configured to accurately describe a position where mutation needs to be performed, so as to avoid meaningless redundancy caused by performing mutation on all positions. The mutation sample may be set to a system sample, a custom fixed value, or a custom range. The system sample has built-in typical mutation values for the single-byte mode and the double-byte mode respectively. If there is no special custom requirement, most abnormalities can be tested based on the built-in typical mutation values. The typical mutation values may be "0000", "4B55", "F61F", and the like. The custom fixed value and the custom range are configured to generate targeted test-specific mutation sample content for semantically-free industrial control communication protocols of various private IOTIPSs after semantic analysis. After determining the mutation strategy, the system traverses a strategy linked list to generate samples for other modules for testing.

A method of triggering the sample generation module includes generating a test task or transferring in an abnormal sample after a round of testing, both of which generate the test sample for test execution. The present disclosure provides a mutation strategy determined in a mode combining a predefined mode and a custom mode. In this way, diversified mutation strategies can be configured, and accuracy and a breadth of the mutation sample can be improved. In addition, secondary learning is performed on an abnormal sample based on a Seq2Seq model of an Attention mechanism introduced. This innovative manner significantly improves a sample hit ratio.

Figure 5:
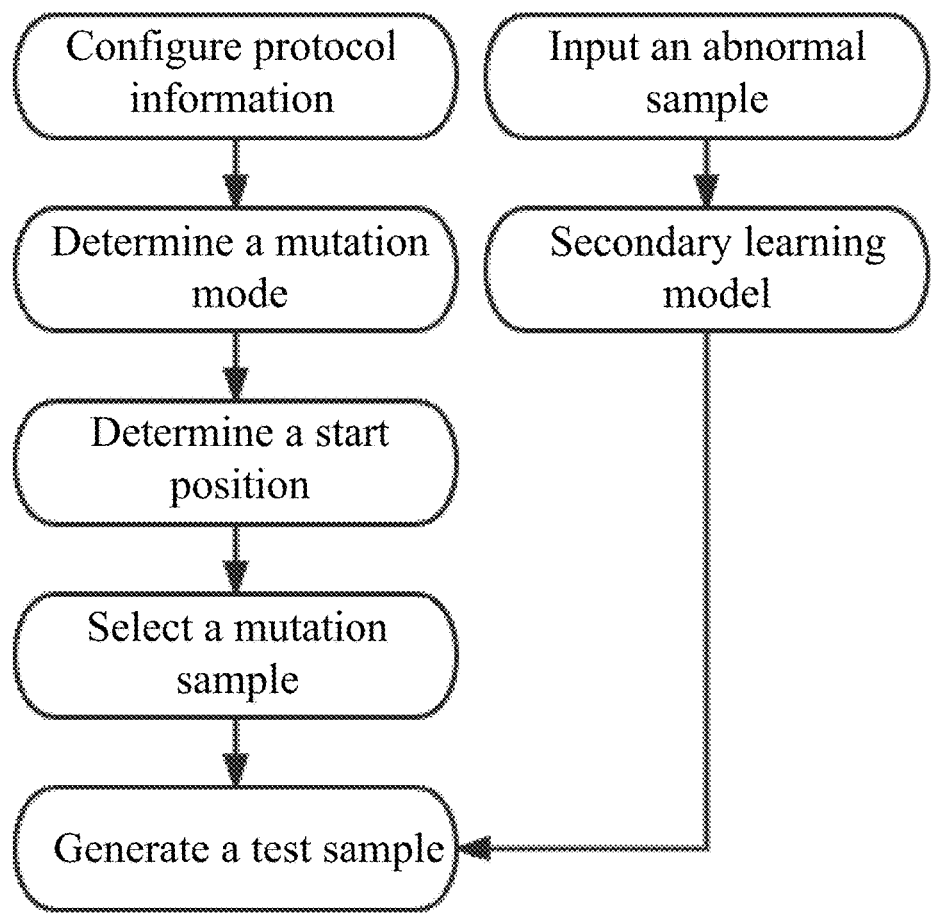
FIG. 5 is a flowchart of sample generation.

The sample generation module sets two execution modes in an implementation process. When the test task is executed, the sample generation module needs to determine and configure protocol information, determines whether to use the single-byte mode or the double-byte mode, determines a start mutation position of the data frame, selects a predefined or custom sample, and then generates, based on the configured mutation strategy, a test sample to be delivered to the execution monitoring module for a first round of testing. After the first round of testing, a second method of triggering the sample generation module includes transferring the test sample generated in the first round of testing to a secondary learning model of the sample generation module, and generating a test sample to be delivered to an execution monitoring system for a second round of testing. A sample generation process is shown in FIG. 5.

Figure 6:
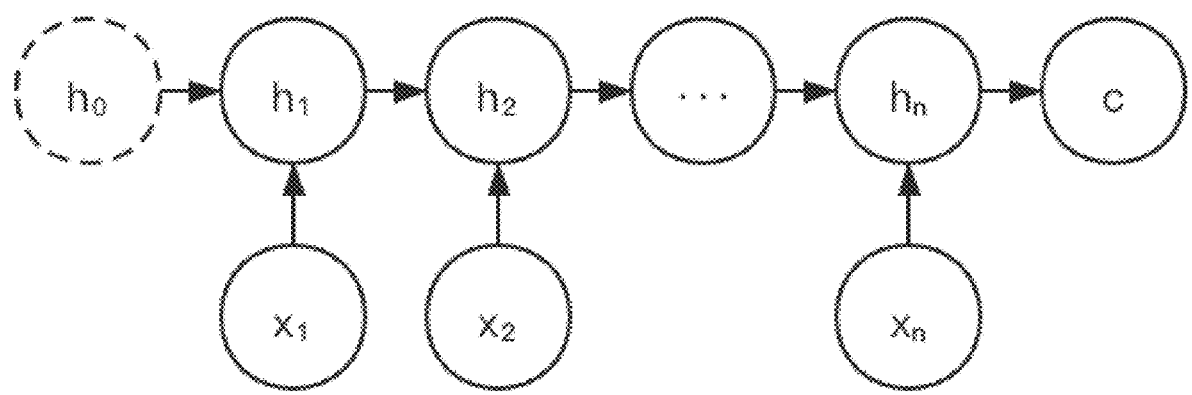
FIG. 6 is a schematic framework diagram of an Encoder.
Figure 7:
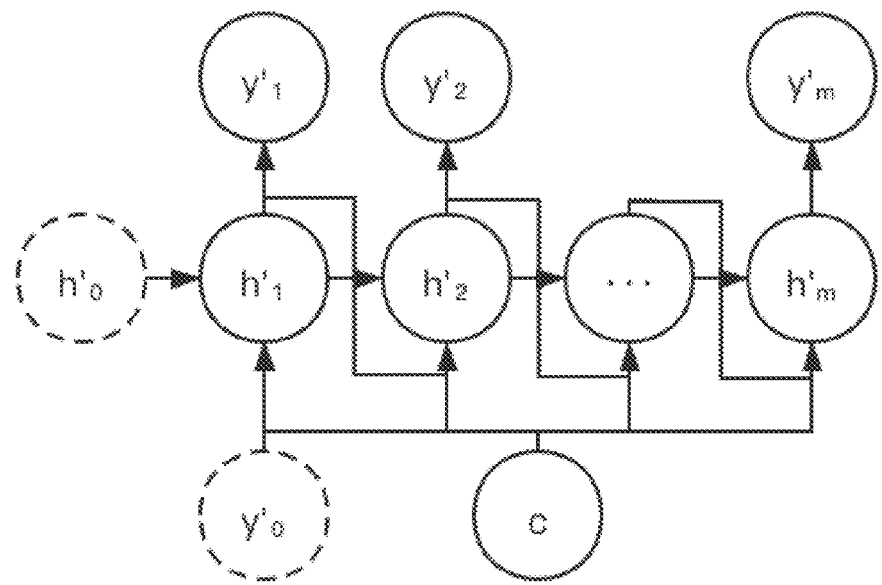
FIG. 7 is a schematic framework diagram of a Decoder.
Figure 8:
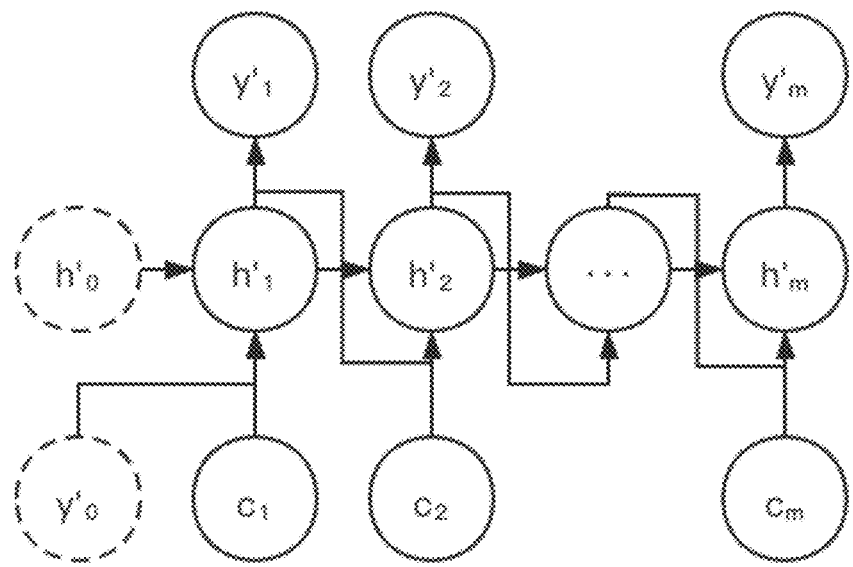
FIG. 8 is a schematic diagram of an Attention framework.

In mutation strategy configuration, the mutation strategy determined in the mode combining the predefined mode and the custom mode is provided. In this way, diversified mutation strategies can be configured, and the accuracy and breadth of the mutation sample can be improved. After a conventional vulnerability detection process, secondary learning is performed on a detection result to generate a data packet with a more obvious vulnerability characteristic, the data packet is transferred to the execution monitoring module again for secondary vulnerability detection, and a test sample causing an abnormality is obtained through verification. In a secondary learning process, the Seq2Seq model of the Attention mechanism introduced is used. The Seq2Seq model mainly includes an Encoder and a Decoder. The Encoder is shown in FIG. 6, the Decoder is shown in FIG. 7, and an Attention structure is shown in FIG. 8. Specifically, after primary detection is completed for the generated sample, secondary learning is performed on a marked abnormal sample by using the Seq2Seq model and then secondary detection is conducted to obtain more abnormal data frames with a higher hit ratio. A field error of a learning sample has a great impact on accuracy of data frame generation. In a model training process, an MAE is configured to express a difference between a predicted data frame and an actual data frame. Assuming that $x_1, x_2, \ldots, x_i$ is configured to represent a predicted data sequence, and $y_1, y_2, y_i$ is configured to represent an actual data sequence, the MAE can be expressed as follows:

$$MAE = \frac{\sum_{i=1}^{n} |y_i - x_i|}{n}$$

where the MAE is more directly expressed as follows:

$$MAE = \frac{1}{n}\sum_{i=1}^{n} |(y_1 - x_1)| + \ldots + |(y_i - x_i)|$$

In the model training process, a loss function is optimized by using a stochastic gradient descent method, where X represents the predicted data sequence $x_1, x_2, \ldots, x_i$ assumed above, and Y represents the actual data sequence $y_1, y_2, \ldots, y_i$, which are represented as logMAE(X, Y) as a whole; and when logMAE(X, Y) reaches a minimum value, values of the variables X, Y are expressed as follows as a whole:

argmin logMAE(X,Y)

A test sample customization model is shown in FIG. 12.

In the predefined mode, the mutation mode includes the single-byte mode and the double-byte mode. In the single-byte mode, a two-bit hexadecimal number in a format of 1A is mutated. In the double-byte mode, a four-bit hexadecimal number in a format of A1 2D is mutated. The system sample uses representative built-in data of the system as a mutation seed to improve test efficiency and avoid consuming lots of resources due to complete traversal. A quantity of mutation samples is 112 in the single-byte mode and 140 in the double-byte mode. For the data frame of the protocol to be detected, a mutation value or range of the sample can be customized, and the corresponding test sample can be generated based on the custom mutation strategy. In addition, the mutation strategy may be selected based on a predefined mutation seed and a custom rule to further improve the accuracy and breadth of the sample. Built-in mutation sample types are shown in FIG. 9.

The execution monitoring module is configured to transfer the test sample generated by the sample generation module to the device to be detected for testing, perform link management and test execution, store the test result, and generate the detection report. The link management is to manage a connection between a test system and the device to be detected, including a link name, a link type, and specific content. The test execution is mainly responsible for selecting a test item to start the test task, including setting a task name, selecting a link, and selecting the mutation strategy. During the test execution, currently completed test content is viewed at any time through status monitoring, including a selected protocol name, a function name, packet sending and receiving time, an original data frame, a mutated data frame, and a response result. The system stores the test result. A data frame with an abnormal response result is additionally marked in the exported report as a main basis for vulnerability analysis.

The execution monitoring module is the only module that directly interacts with the device to be detected in the system, and is also a module responsible for task execution and scheduling.

Figure 10:
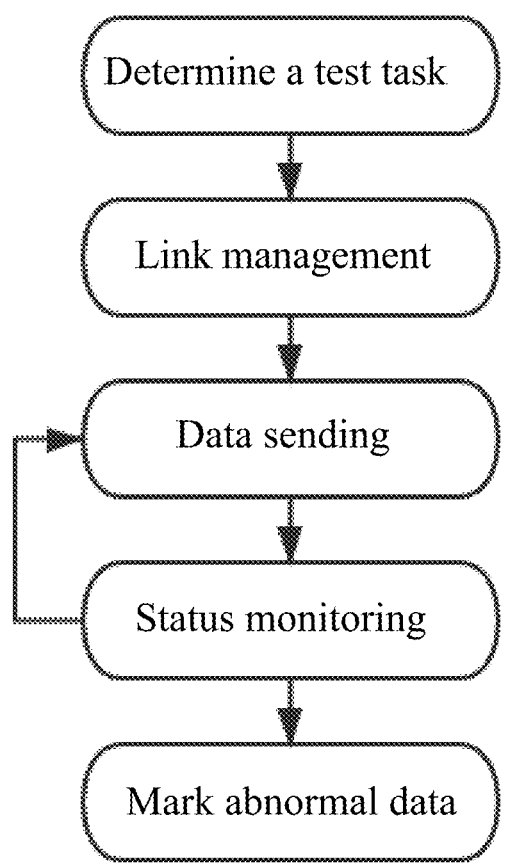
FIG. 10 is a flowchart of execution monitoring.

Specifically, the execution monitoring module is configured to establish a link connection, execute the test task, configure a test method for the test task, add, delete, edit, and view the test task, query a test progress, query mutation details, and manage the test task. The execution monitoring module can configure and manage the test task, view an execution progress of the test task, and view and analyze mutation details of a completed task (for example, correctly record and print a suspicious data packet, where the recorded information includes target information, test time, an abnormal behavior, and the like), to facilitate analysis and abnormality tracking of the detection process and result. The execution monitoring module also has a function of exporting the detection report. An execution monitoring process is shown in FIG. 10.

Figure 13:
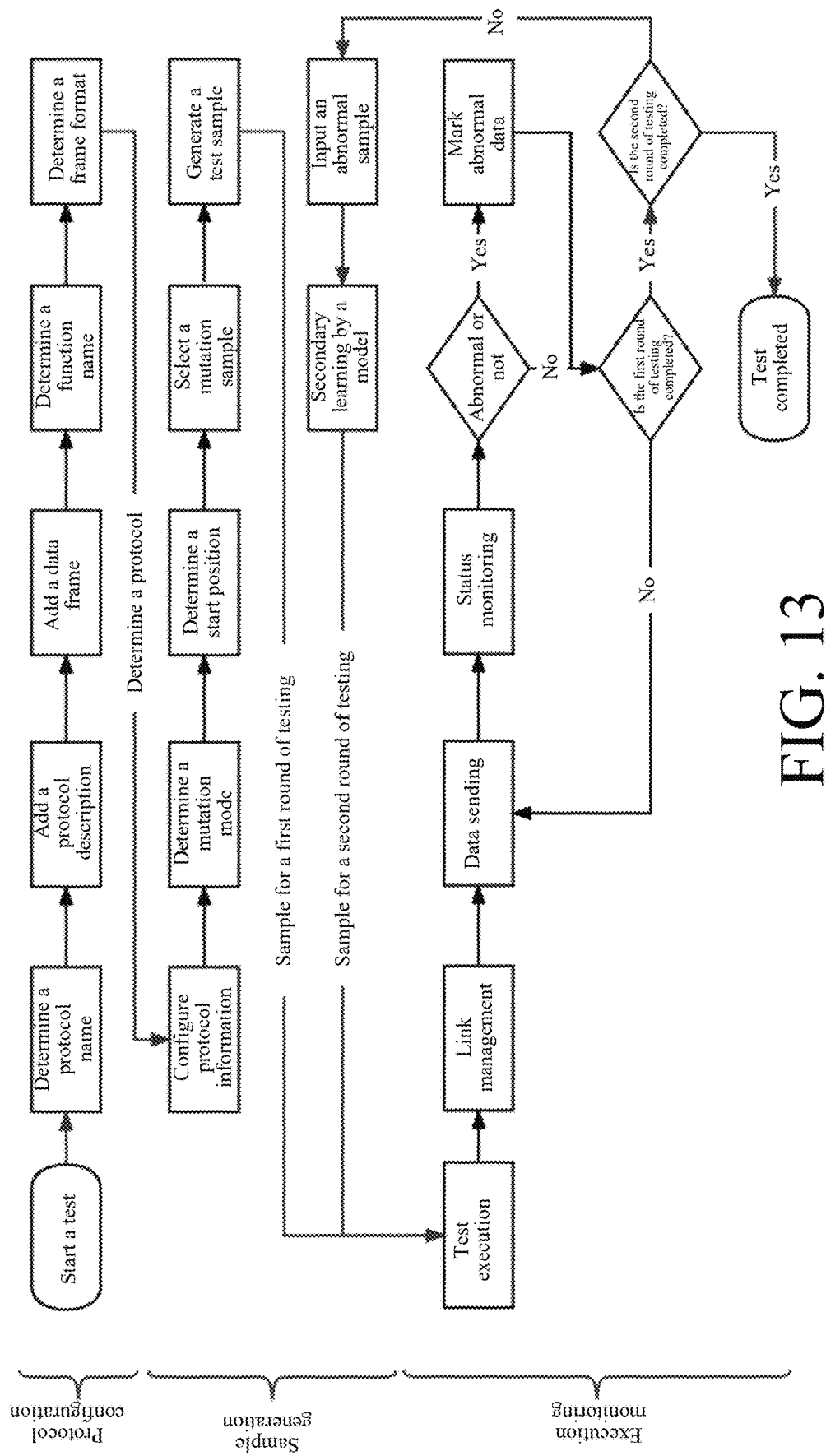
FIG. 13 is a flowchart based on a system for detecting a vulnerability of an IOTIPS protocol based on fuzz testing according to the present disclosure.

The working principle of the present disclosure is as follows:

A working process of the system is shown in FIG. 13.

When a test is started, a protocol configuration phase is entered first. In the protocol configuration module, a protocol name needs to be determined first, a relevant protocol description needs to be added while the protocol name is determined, and then a required data frame is added based on the determined protocol. For the data frame, a function name and a frame format need to be determined. After that, the determined protocol can be transferred to the sample generation module.

After the protocol is determined, a sample generation phase is entered for the first time. Protocol information is configured based on the determined protocol, and a mutation mode to be used is selected, which may be the single-byte mode or the double-byte mode. Then a start mutation position is determined to mainly determine a mutation sample in the data frame. After that, the mutation sample is selected in the predefined mode, the custom mode, or a combination thereof. A sample for a first round of testing is generated based on the mutation strategy determined above, and is transferred to the execution monitoring module for sending.

After the sample for the first round of testing is received, a test execution phase is entered for the first time, and link management is performed in turn to mainly manage a connection between a test system of a user and a device to be detected, mainly including a link name, a link type, and specific content. After that, a data sending test is conducted, and then status monitoring is performed to wait for a response of the device to be detected. If the device to be detected responds normally, the sample test passes. If the device to be detected fails to respond after timeout, it is determined that a response status is abnormal, and sent test sample data is marked as abnormal data and recorded. If there is still a test sample that is not sent, the data sending is continuously performed. If all data has been sent, the execution phase is completed once. Whether a second round of testing is completed is determined. If the second round of testing is completed, an abnormal sample is transferred to the sample generation module.

The sample generation phase is entered for the second time. The abnormal sample in the first round of testing is used as an input, the Seq2Seq model of the Attention mechanism introduced is configured for secondary learning to generate a sample with a more obvious abnormality characteristic for the second round of testing, and the generated sample is transferred to the execution monitoring module.

After the execution monitoring module is executed for the second time, test execution, link management, data sending, and status monitoring are performed, which are the same as those performed when the execution monitoring phase is entered for the first time. After the data sending, if it is determined that a first round of testing and a second round of testing are completed, the whole test is completed. After that, a result related to complete task execution can be queried in the system.

The embodiments of the present disclosure further provide a method for detecting a vulnerability of an IOTIPS protocol based on fuzz testing, including steps of:

protocol configuration: configuring a protocol to be detected and a data frame of the protocol to be detected, specifically including: determining a protocol name, adding a protocol description while creating the protocol name, adding, based on a test need after determining a protocol, a data frame that needs to be tested, and determining a function name and a frame format of the configured data frame, to load the configured protocol and the configured data frame to a sample generation module;

sample generation: after loading the configured protocol and the configured data frame, configuring a mutation strategy based on the loaded protocol, and generating a test sample based on the configured mutation strategy, where a method of triggering the sample generation step includes generating a test task or transferring in an abnormal sample after a round of testing, both of which generate the test sample for test execution; when the test task is executed, in the sample generation step, it is necessary to determine and configure protocol information, determine whether to use a single-byte mode or a double-byte mode, determine a start mutation position of the data frame, select a predefined or custom sample, and then generate, based on the mutation strategy configured by the sample generation module, a test sample to be delivered to an execution monitoring system for a first round of testing; and after the first round of testing, a second method of triggering the sample generation includes transferring the test sample generated in the first round of testing to a secondary learning model of the sample generation module, and generating a test sample to be delivered to the execution monitoring system for a second round of testing; and execution monitoring: transferring the test sample generated by the sample generation module to a device to be detected for testing, performing link management and test execution, storing a test result, and generating a detection report.

Compared with a traditional fuzz testing method, the present disclosure can effectively improve detection efficiency of an industrial control communication protocol of an IOTIPS and mine a vulnerability of the industrial control communication protocol by analyzing the industrial control communication protocol of the IOTIPS and conducting a test experiment on an industrial control device.

The above described are merely specific implementations of the present disclosure, and the protection scope of the present disclosure is not limited thereto. Any modification or replacement easily conceived by those skilled in the art within the technical scope of the present disclosure should fall within the protection scope of the present disclosure. Therefore, the protection scope of the present disclosure should be subject to the protection scope of the claims.

The invention claimed is:

1. A system for detecting a vulnerability of an Internet of Things in Power Systems (IOTIPS) protocol based on fuzz testing, comprising:

a protocol configuration module configured to configure a protocol to be detected and a data frame of the protocol to be detected;

a sample generation module configured to: after loading the protocol and the data frame configured by the protocol configuration module, configure a mutation strategy based on the loaded protocol, and generate a test sample based on the configured mutation strategy; and an execution monitoring module configured to transfer the test sample generated by the sample generation module to a device to be detected for testing, perform link management, perform test execution, store a test result, and generate a detection report;

wherein a method of triggering the sample generation module comprises generating a test task or transferring in an abnormal sample after a round of testing, which is specifically as follows: responsive to executing the test task, determining and configuring protocol information by means of the sample generation module, determining whether to use a single-byte mode or a double-byte mode, determining a start position of the data frame where mutation needs to be started, selecting a predefined or custom sample, and then generating, based on the configured mutation strategy, the test sample to be delivered to an execution monitoring system for a first round of testing by means of the sample generation module; and after the first round of testing, a second method of triggering the sample generation module comprises transferring the test sample generated in the first round of testing to a secondary learning model of the sample generation module, and generating a test sample to be delivered to the execution monitoring system for a second round of testing; and a Seq2Seq model of an Attention mechanism introduced is used in secondary learning, wherein the Seq2Seq model mainly comprises an Encoder and a Decoder; after primary detection is completed for the generated sample, the secondary learning is performed on a marked abnormal sample by using the Seq2Seq model and then secondary detection is conducted to obtain more abnormal data frames with a higher hit ratio; and in a model training process, a mean absolute error (MAE) is configured to express a difference between a predicted data frame and an actual data frame, wherein assuming that $x_1, x_2, \ldots, x_i$ is configured to represent a predicted data sequence, and $y_1, y_2, \ldots, y_i$ is configured to represent an actual data sequence, the MAE is expressed as follows:

$$MAE = \frac{\sum_{i=1}^{n} |y_i - x_i|}{n}$$

wherein the MAE is more directly expressed as follows:

$$MAE = \frac{1}{n}\sum_{i=1}^{n}|(y_1 - x_1)| + \ldots + |(y_i - x_i)|;$$

in the model training process, a loss function is optimized by using a stochastic gradient descent method, wherein X represents the predicted data sequence $x_1, x_2, \ldots, x_i$ assumed above, and Y represents the actual data sequence $y_1, y_2, \ldots, y_i$; and responsive to logMAE(X, Y) is obtained reaches a minimum value, values of the variables X, Y are expressed as follows as a whole: argmin logMAE(X, Y).

2. The system for detecting a vulnerability of an IOTIPS protocol based on fuzz testing according to claim 1, wherein the protocol configuration module configuring the protocol to be detected and the data frame of the protocol to be detected specifically comprises: determining a protocol name, adding a protocol description while creating the protocol name, adding, based on a test need after determining the protocol, a data frame that needs to be tested, and determining a function name and a frame format of the configured data frame.

3. The system for detecting a vulnerability of an IOTIPS protocol based on fuzz testing according to claim 1, wherein the configuring a mutation strategy comprises configuring a strategy name, a protocol name, a function name, a frame preview, a mutation mode, the start position, and a mutation sample, wherein the strategy name, the protocol name, the function name, and the frame preview belong to description fields.

4. The system for detecting a vulnerability of an IOTIPS protocol based on fuzz testing according to claim 3, wherein the mutation mode comprises the single-byte mode and the double-byte mode, and whether to use the single-byte mode or the double-byte mode is customized based on a semantic need of a field.

5. The system for detecting a vulnerability of an IOTIPS protocol based on fuzz testing according to claim 3, wherein the start position is configured to accurately describe a position where mutation needs to be performed, so as to avoid meaningless redundancy caused by performing mutation on all positions.

6. The system for detecting a vulnerability of an IOTIPS protocol based on fuzz testing according to claim 3, wherein the mutation sample is set to a system sample, a custom fixed value, or a custom range, the system sample has built-in typical mutation values corresponding to the single-byte mode and the double-byte mode respectively, the custom fixed value and the custom range are configured to generate targeted test-specific mutation sample content for semantically-free industrial control communication protocols of various private IOTIPSs after semantic analysis.

7. The system for detecting a vulnerability of an IOTIPS protocol based on fuzz testing according to claim 1, wherein the link management performed by the execution monitoring module is to manage a connection between a test system and the device to be detected, comprising a link name, a link type, and specific content; the test execution is responsible for selecting a test item to start the test task, comprising setting a task name, selecting a link, and selecting the mutation strategy; and during the test execution, currently completed test content is viewed at any time through status monitoring, comprising a selected protocol name, a function name, packet sending and receiving time, an original data frame, a mutated data frame, and a response result, and the system stores the test result, and marks a data frame with an abnormal response result in an exported report as a main basis for vulnerability analysis.

\* \* \* \* \*